United States Patent [19]

Komoto et al.

[11] 4,372,406
[45] Feb. 8, 1983

[54] ELECTRONIC BALANCE

[75] Inventors: Akira Komoto, Otsushi; Tomohiro Tsuji, Ujishi, both of Japan

[73] Assignee: Shimadzu Corporation, Kyoto, Japan

[21] Appl. No.: 258,512

[22] Filed: Apr. 28, 1981

[30] Foreign Application Priority Data

Apr. 30, 1980 [JP] Japan .................. 55-58388
Jul. 15, 1980 [JP] Japan .................. 55-97319

[51] Int. Cl.³ .............................. G01G 7/02
[52] U.S. Cl. ........................ 177/212; 177/210 EM
[58] Field of Search ................ 177/212, 210 EM

[56] References Cited

U.S. PATENT DOCUMENTS 4,245,711  1/1981  Kunz ................. 177/212

FOREIGN PATENT DOCUMENTS 2722093  8/1978  Fed. Rep. of Germany ...... 177/212

Primary Examiner—Joseph W. Hartary
Attorney, Agent, or Firm—Koda and Androlia

[57] ABSTRACT

An electronic balance includes a system in which a current supplied to a force coil in response to a load applied to the balance is caused to alternate in direction at such a time interval as to permit of no oscillations and in which the measured value is obtained by subtracting the product of the current in the negative direction and a time fraction $t_2$ for which the same flows from the product of the current in the positive direction and a time fraction $t_1$ for which the same flows, the sum of said time fractions $t_1$ and $t_2$ being equal to each of said time intervals.

9 Claims, 9 Drawing Figures (A)

(B)

W>0    W=0    W<0

W>0    W=0    W<0

ELECTRONIC BALANCE

BACKGROUND OF THE INVENTION

1. Field of the Invention

This invention relates to an electronic balance, and more particularly, to an electronic balance utilizing electromagnetism induced in response to a load applied thereto.

2. Description of the Prior Art

In general, known electronic balances are designed to weigh an object placed on the pan or tray by balancing the applied load and a force induced in the coil placed in a magnetic field and measuring the current value obtained therethrough. In this type of balances the Joule heat liberated in the coil varies in a relatively large range in accordance with the load, that is, the weight of an object placed on the balance. This causes temperature variations inside the balance, whereby its mechanical and electrical components are subjected to detrimental temperature changes. This is likely to cause an error in measuring the weight, and spoil the accuracy and reliability which are considered as essential to the balance.

To overcome this problem of temperature variations, there have been many proposal, among which is the employment of an extra heat generator near the coil. The heat generated by it is controlled to compensate for changes in the heat liberated by the coil, thus maintaining the thermal equilibrium. However, it is not advantageous to provide an additional heat generator because of the resulting structural complicacy and high cost.

The present invention aims at solving the problems pointed out above with respect to the known electronic balances, and has for its object to provide an improved electronic balance capable of controlling the heat liberated in the coil at a constant value irrespective of the amount of an applied load, or the application or nonapplication of a load.

Another object of the present invention is to provide an improved electronic balance capable of measuring a load applied thereto either in the positive direction or the negative direction.

Other objects and advantages of the present invention will become apparent from the detailed description given hereinafter; it should be understood, however, that the detailed description and specific embodiments are given by way of illustration only, since various changes and modifications within the spirit of the invention will become apparent to those skilled in the art from this description.

SUMMARY OF THE INVENTION

According to the present invention an electronic balance includes a system in which a current supplied to a force coil in response to a load applied to the balance is caused to alternate in direction at such time interval as to permit of no oscillations, and in which the measured value is obtained by subtracting the product of the current in the negative direction and a time fraction $t_2$ for which the same flows from the product of the current in the positive direction and a time fraction $t_1$ for which the same flows, the sum of said time fractions $t_1$ and $t_2$ being equal to each of said time intervals.

DETAILED DESCRIPTION OF THE INVENTION

Figure 1:
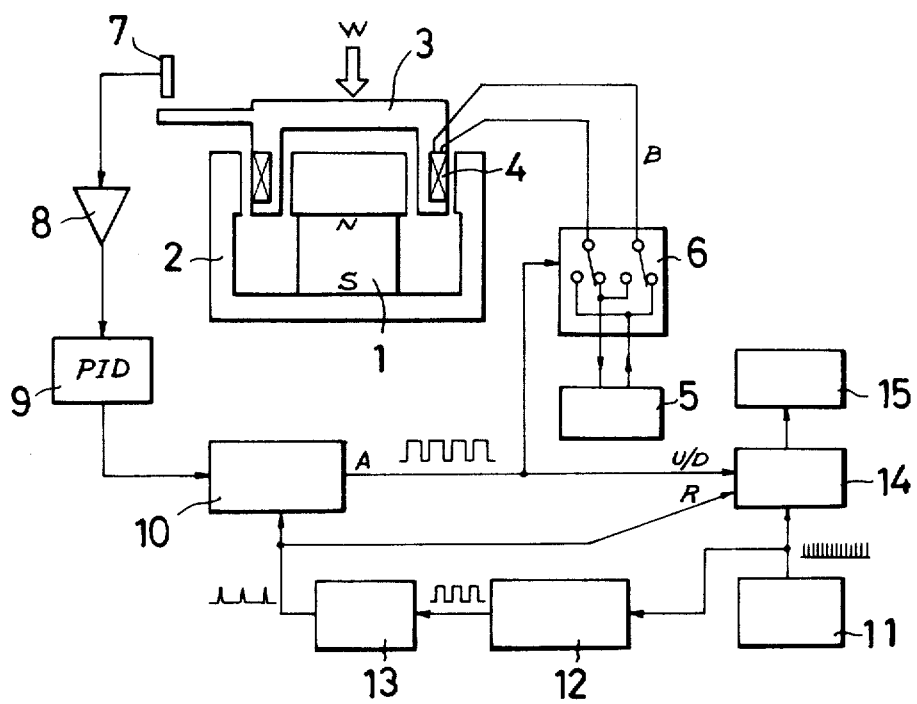
FIG. 1 is a schematic view of the electronic balance and a block circuit diagram contained therein.

Referring to FIG. 1 the balance includes a fixed portion and a movable portion constructed by the Roberval mechanism. A permanent magnet 1 and magnetic circuit 2 are provided in a known manner at the fixed portion. The balance is mounted on a base. The movable portion includes a tray 3 adapted to receive an object to be weighed. The tray has a pair of legs extending into gaps produced in the magnetic circuit 2. The legs are provided with windings of conductor, and as a whole they constitute a coil 4. In the drawing the movable portion is schematically shown with the omission of detailed illustrations. When any load is applied to the tray 3, a downward force exerts; hereinafter, it will be referred to as a positive load or force with designation of (W). In contrast, when the tray undergoes an upward force, it will be as a negative load or force. In response to a negative load to the tray 3, the coil 4 undergoes a downward urge. At this stage, when a positive current is supplied to the coil, the movable portion of the balance creates an upward force defying the load (W). If the load is applied in the negative direction, or if the coil is supplied with a negative current, the reacting force will be created in the opposite direction.

Steady currents are supplied from a source 5 to the coil 4 through a current change-over switch 6, the switch being adapted to switch two points at given time intervals ranging from 0.1 sec to 0.1 msec. Accordingly, the currents passing through the coil alternate in direction. The alternation of current direction is effected by feedback signals, which will be hereinafter described in greater detail.

The movable portion of the balance is displaced either above or below its stage of equilibrium when a load is applied thereto. This displacement is detected by means of a sensor 7, which can be of a known type employing any of a capacitor, a photoelectric element, a differential transformer, or the like. In any case, in response to the downward displacement of the movable portion, a positive voltage is induced in the coil in proportion to the amount of the displacement. If the displacement of the movable portion occurs upwards, a negative voltage is induced therein in proportion to the amount of the upward displacement.

Figure 2:
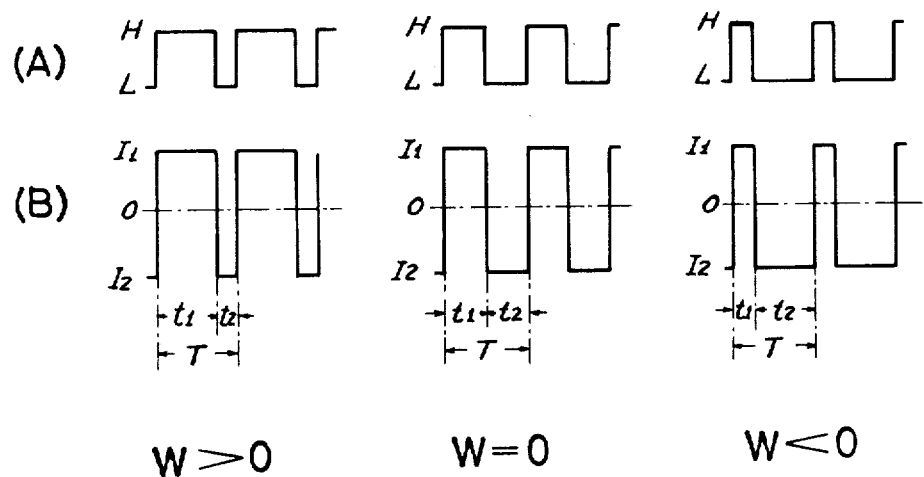
FIG. 2 shows waveforms of signals produced in the system in FIG. 1.

The output of the sensor 7 is amplified by means of an amplifier 8, and is input to a circuit 10 via a known PID controller 9, the circuit being adapted to produce a rectangular waveform signal (A) with a period T on the basis of pulses sent at time interval of T. The period T is divided into two time fractions $t_1$ and $t_2$. The rectangular waveform signal (A) is formed with the high level elements for $t_1$ and the low level elements for $t_2$. The difference between time fractions $t_1$ and $t_2$ is converted so as to conform to the output of the PID controller 9. As commonly known, when the load and the current passing through the coil are in quilibrium, the PID output remains proportional to the amount of the load. Accordingly, as shown in FIG. 2, the rectangular waveform signal (A) varies in form depending upon the directions of the load; that is, when the load is applied in the positive direction, the time $t_1$ becomes larger than the time $t_2$: when the load is zero, $t_1$ is equal to $t_2$, and when the load is in the negative direction, $t_2$ becomes larger than $t_1$. This rectangular waveform signal (A) drives the change-over switch 6. As a result, the current passing through the coil 4 is provided with a rectangular waveform having the same periodity and duty-factor as those of the signal (A), wherein the peak values are equal in the positive and negative directions.

A pulse train having the period T is produced by means of a clock oscillator 11, a frequency divider 12 for dividing the clock frequency into the desired periods T, and a one-shot multivibrator 13 producing a trigger pulse at the initial moment of the output of the frequency divider. If the period T is too long, undersired vibractions will occur, while it is too short, it will become difficult to ensure an accurate measurement and an quick response of the related devices. Practicably, the range of 0.1 sec to 0.1 msec is desirable.

An up-down counter 14 counts the clocks for time fraction $t_1$ at the upper side, and counts for time fraction $t_2$ at the lower side. Thus, the obtained value is always proportional to $(t_1-t_2)$. This value is displayed on an indicator 15. The counter is reset each cycle.

As described above, the positive current $I_1$ and the negative current $I_2$ are alternated, thereby inducing a positive and negative force alternately. Thus, if the average value is F with the constant period T, then $$F = t_1 iK - t_2 iK \tag{1}$$

$$= (t_1 - t_2)iK$$

where K is a constant decided by the structure of the magnet and the coil, and where i is the peak value of the current, i.e. $i = I_1 = |I_2|$.

The equation can be rewritten as follows:

$$F = t_1 iK - (T - t_1)iK \tag{2}$$

$$= (2t_1 - T)iK$$

Here, if $t_2$ is constant, then $$F = t_1 iK - K_2 \tag{3}$$

where $K_2 = t_2 iK$ = constant,

As evident from the equations (1), (2) and (3), the average value of forces induced in the coil is proportional to the difference between $t_1$ and $t_2$, and if the period T is constant, it is proportional to $2t_1$, and if $t_2$ is constant, it becomes the function of $t_1$.

The heat P generated by the coil 4 for the period of time T is expressed by $$P = (i^2 R t_1 + i^2 R t_2) \tag{4}$$

$$= i^2 RT$$

where R is the resistance of the coil.

This means that the heat generated is constant regardless of the application or non-application of a load or its amount. This also means that it is equal to the heat generated when a current i is steadily passed through the coil. In this way it has been found that a thermal equilibrium is always reached a certain period of time after the passing of a current through the coil. As a result, the balance is kept safe from possible troubles due to detrimental temperature changes, such as elongation and contraction of the used components, change in the convention and deterioration of the magnet. Thus, the reliability of the balance is secured.

Figure 3:
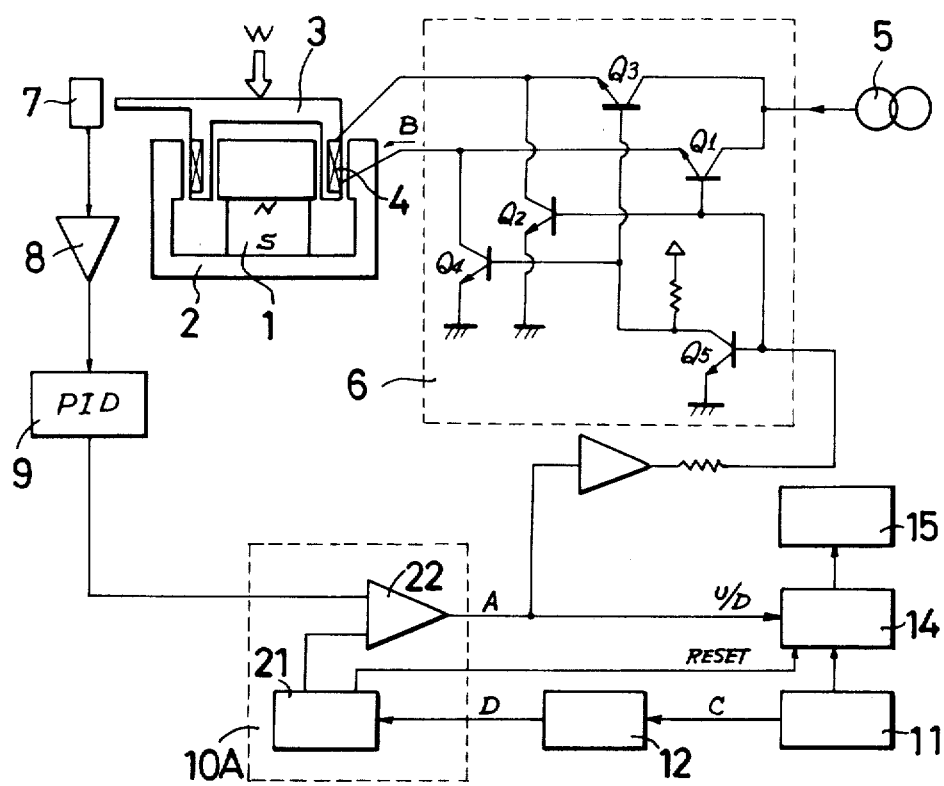
FIG. 3 is a block circuit diagram illustrating the operation of the system in FIG. 1 in detail.
Figure 4:
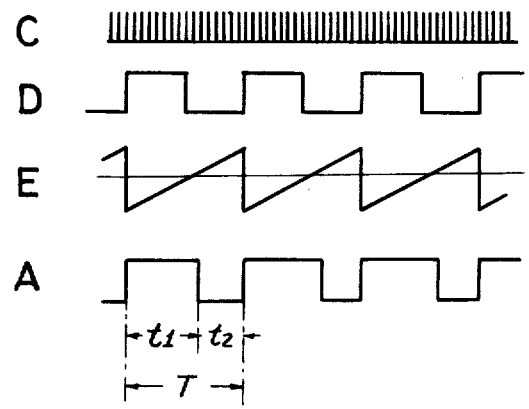
FIG. 4 shows waveforms of signals produced in the system in FIG. 3.

Now, referring to FIGS. 3 and 4, preferred embodiments will be described in greater detail; in which the explanation of the elements indicated by like reference numerals to FIG. 1 will be omitted:

The switch 6 includes semiconductor switching elements indicated by $Q_1$ to $Q_5$ which are all p-n-p transistors. The elements $Q_1$ to $Q_4$ control the passage of currents flowing from the steady current source 5 to the coil 4, and the element $Q_5$ functions as an inverter for inverting the levels of input and output from one to another. When the control signal (A) is on the H level, $Q_1$ and $Q_2$ are on while $Q_3$ and $Q_4$ are off, thereby allowing the current to flow in the direction indicated by B (FIG. 3). When the control sign (B) is on the L level, $Q_3$ and $Q_4$ are on while $Q_1$ and $Q_2$ are off, thereby allowing the current to flow in the opposite direction.

A voltage-time difference converter 10A includes a sawtooth wave oscillator 21 having a period T, and a comparator 22 adapted to compare the output of the PID controller and the sawtooth wave output. The converter 10A outputs the H level for time fraction $t_1$ when the output of the PID controller is larger than the sawtooth wave output, and outputs the L level for time fraction $t_2$ when the output of the PID controller is smaller than the sawtooth wave output. The d.c. level of the sawtooth wave is beforehand adjusted such that the time fractions $t_1$ and $t_2$ are equal when the output of the PID controller is zero. For actual application a suitable adjuster will be provided to calculate a deduction of packaging and/or an average value, but it is not illustrated in the drawings because of the irrelevancy to the essence of the present invention.

For the oscillator for use in providing the pulsation of the period T a high precision oscillator, such as a crystal oscillator, is employed. Nevertheless, a certain degree of fluctuation in the clock frequency f is unavoidable, and the resulting affects must be taken into account. However, the embodiment illustrated in FIG. 3 can input a single clock pulse both to the sawtooth wave oscillator 21 and the up-down counter 14, and accordingly, the possible adverse effects from the decrease and increase of the frequencies f of the clock pulse are effectively counterbalanced, thereby maintaining the value $(t_1-t_2)\cdot f$ constant.

Figure 5:
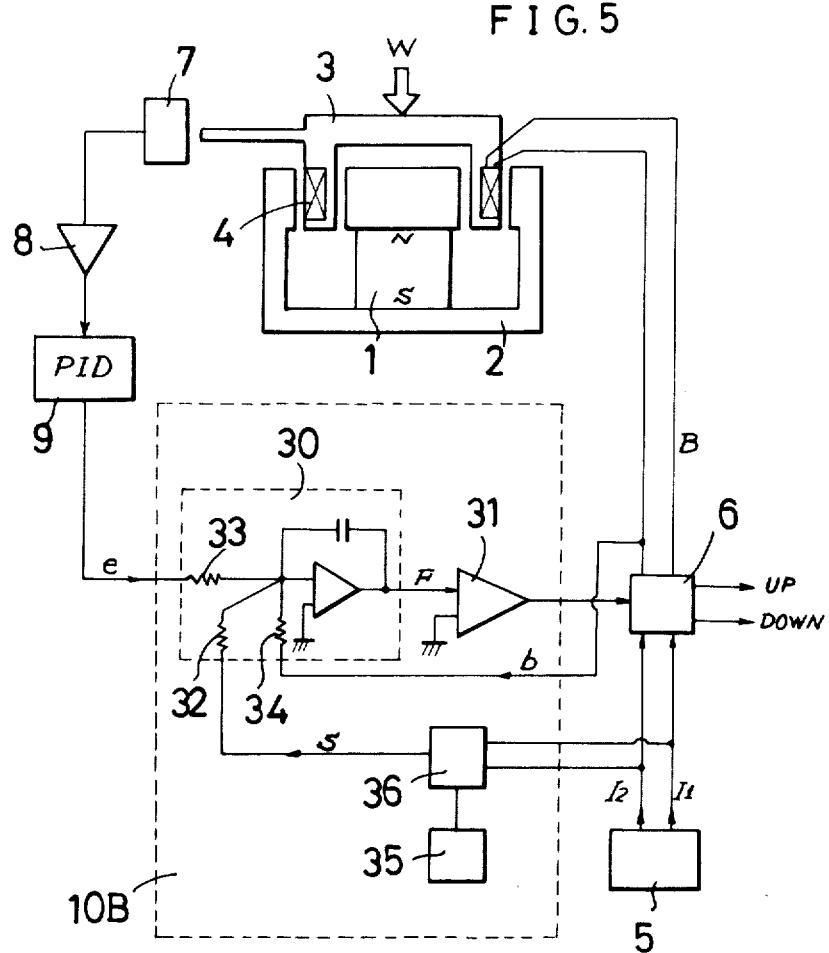
FIG. 5 is an alternative embodiment of the electrical part of the balance.

Referring to FIG. 5, a further version of the embodiments will be described:

In this embodiment the voltage-time difference converter 10B is slightly modified in comparison with that of FIG. 1, in that it includes an integrator 30 and a comparator 31. The integrator has a given duty-factor, such as a ½ duty factor, and is adapted to receive an input signal which consists of a reference signal (S) of waveform having equal peak values in the positive and negative, a PID outut signal (e) changeable in response to the load (W), and a feedback pulse signal (b) for feeding back part of the current B (FIG. 3) supplied to the coil 4. These signals are superimposed through input resistances 32, 33 and 34, respectively. The reference signal (S) consists of a signal setting the time for a duty controller 35, and a signal setting the current peak value of the steady current source 5, and is produced by means of a reference signal oscillator 36. The comparator 31 finds whether the voltage level (F) of the output from the integrator 30 is positive or negative, and outputs the H level when it is positive and the L level when it is negative.

Figure 6:
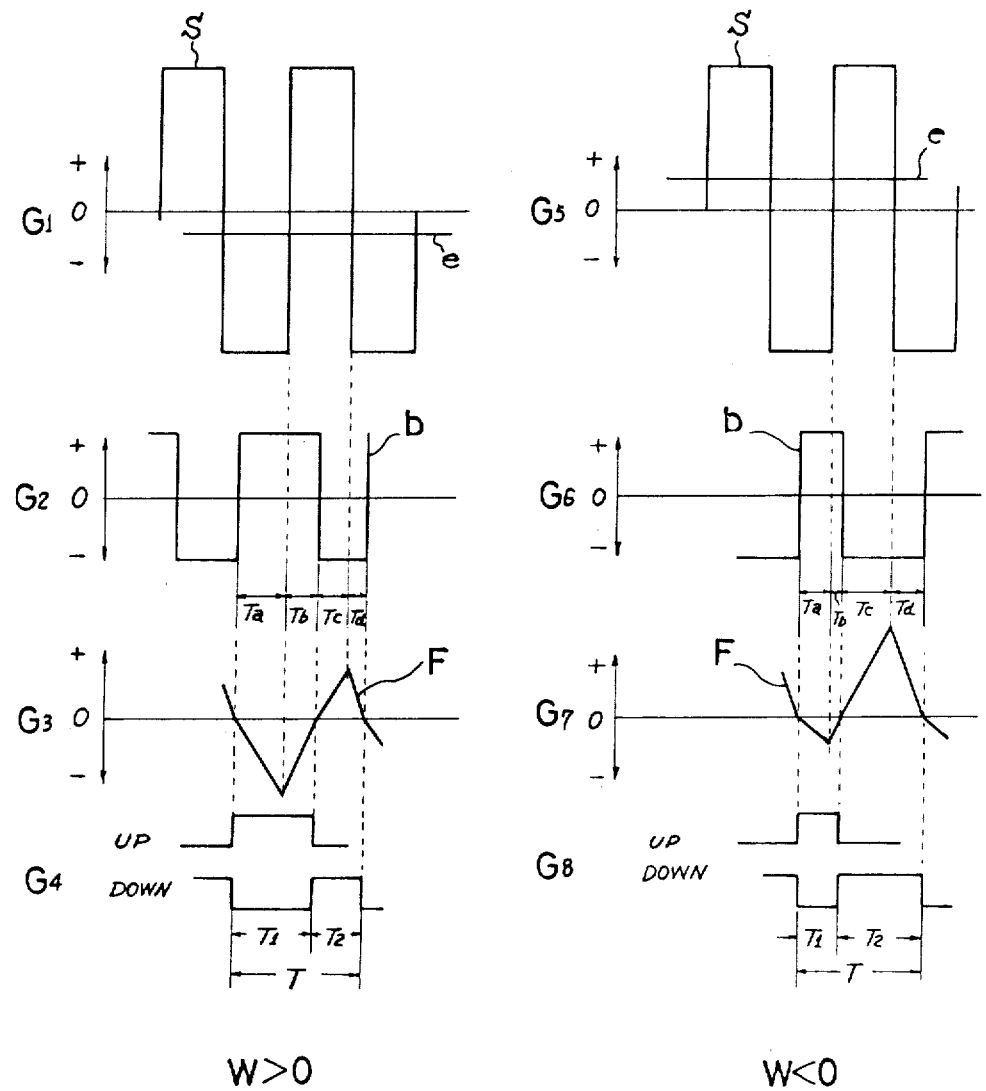
FIG. 6 shows waveforms of signals produced in the system in FIG. 5.

Referring to FIG. 6, a typical example of the operation will be explained:

The diagram $G_1$ shows a state in which the reference signal (S) and the PID output signal (e) are superimposed. The diagrams $G_1$ to $G_4$ in the left show the states when the load is positive, while the diagrams $G_5$ to $G_8$ in the right shows the states when the load is negative. If the feedback pulse signal (b) takes the rectangular waveform as shown in $G_2$, in which $T_a$, $T_b$, $T_c$ and $T_d$ indicate time differences between the reference signal (S) and the feedback signal (b), the output (F) of the integrator 30 will be expressed $$F = \int (S+e+b)dt \quad (5)$$

Therefore, the waveform will become a form in which it shifts from positive to negative when the feedback signal (b) rises, and a form in which it shifts from negative to positive when the signal (b) decreases.

When the balance is in equilibrium, the equation (5) is satisfied, provided that $$\left.\begin{array}{l}(-S + e + b)T_a + (S + e + b)T_b = 0 \\ (S + e - b)T_c + (-S + e = b)T_d = 0\end{array}\right\} \quad (6)$$

$$T_a + T_d = T_b + T_c$$

From the equation (6)

$$e = b \cdot \frac{T_2 - T_1}{T} \quad (7)$$

The feedback pulse signal (b) is proportional to the current (B) supplied to the coil 4, and if the $(T_2 - T_1)$ and T are known, the load can be derived.

Figure 7:
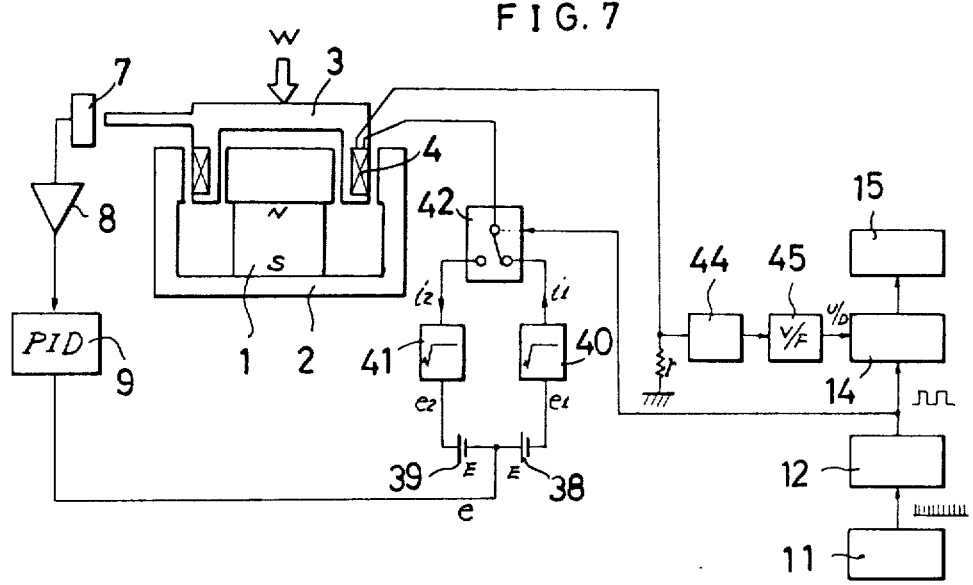
FIG. 7 is a further version of the embodiments of the electrical part of the balance.

Referring to FIG. 7, a still further example of the embodiments will be described:

The system illustrated therein includes two steady current sources 38 and 39, two power-output root amplifiers 40 and 41, a current change-over switch 42, an absolute value converter 44 and a voltage-frequency converter 45. The like reference numbers to FIG. 1 indicate the same components or elements.

This embodiment is operated as follows:

The output voltage of the PID controller 9 is e, and the voltage of steady voltage sources 38 and 39 are E; then the input $e_1$ of the first root amplifier 40 is expressed by $$e_1 = E + e$$

The input $-e_2$ of the second root amplifier 41 is expressed by $$-e_2 = -(E-e)$$

The output currents $I_1$ and $I_2$ of the first and second root amplifiers 40 and 41 are expressed by $$I_1 = \sqrt{e_1} = \sqrt{E + e} \quad (8)$$

$$I_2 = \sqrt{-e_2} = \sqrt{E - e} \quad (9)$$

As described above, the currents passing through the coil 4 are periodically changed in directions by means of the current change-over switch 42. If the output of the rectangular waveform oscillator 43 is on the H level for time fraction $t_1$, and is on the L level for time fraction $t_2$, the relation $t_1 = t_2$ is constantly maintained.

Figure 8:
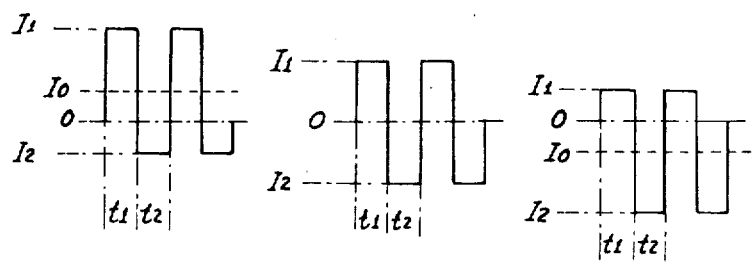
FIG. 8 shows waveforms of signals produced in the system in FIG. 7.

FIG. 8 shows the modes of changes in the waveforms of the currents passing through the coil 4. When the load (W) is zero, the average current I will be zero. As the load (W) increases in the positive direction, the average current increases, and as the load increases in the negative direction, it decreases below zero.

The rectangular waveform current is converted into a voltage through resistance r, and after its absolute value has been changed, the voltage value is converted into a frequency. While the current is positive, or the during the period of time fraction $t_1$ the pulses in terms of the frequencies are counted at the upper side of the counter 14. While the current is negative or during the period of time fraction $t_2$ they are counted at the lower side thereof. Therefore, the measured value of the counter 14 for one frequency becomes proportional to $(I_1 - I_2)$ or in other words, to the average value $I_0$ of the coil, which is displayed on the indicator 15.

As described above, the coil 4 induces forces alternately in the positive and negative directions, and if the average value of the forces is F, the following relation can be derived from $(t_1 - t_2)$.

$$F = \frac{I_1 - I_2}{2} K \quad (10)$$

where K is a constant decided by the structure of the magnet and the coil.

The heat liberated in the coils, that is, the resulting heat P is $$P = (I_1^2 + I_2^2)R \quad (11)$$

where R is the resistance of the coil.

The equation (11) can be rewritten from the equations (8) and (9)

$$P = (E + e + E = e)R \quad (12)$$

$$= 2ER$$

This means that P is constant.

The embodiment illustrated in FIG. 8 can be modified by simplifying the structure by the use of an ordinary current-voltage converter substituting the root amplifiers 40 and 41. In this case, $$e_1 = E + e = I_1$$

$$-e_2 = E - e = I_2$$

Therefore, $$I_1 + I_2 = 2E = C$$

This means that $(I_1 + I_2)$ is constant. The heat P liberated is expressed with the C above $$P = 2R(I_1^2 - CI_1 + \tfrac{1}{2}C^2) \tag{13}$$

When the load is zero, $I_1$ will be equal to $\tfrac{1}{2}C$.
Therefore, $P = \tfrac{1}{2}C^2 R$
When the load is at maximum ($I_2 = 0$), $I_1 = C$; then $$P = C^2 R$$

From this, it follows that the liberated heat varies in the range of $\tfrac{1}{2}$ to 1 in accordance with the load changing from 0 to the maximum. Under the conventional practice the liberated heat changes in the range of 0 to 1, and as compared with it, this modified embodiment is nevertheless advantageous.

Figure 9:
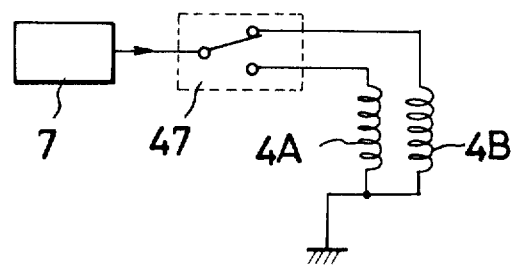
FIG. 9 is a circuit diagram of a modified version of the coil.

Referring to FIG. 9, a modified version of the coil is made up of two coils, that is, a first coil 4A and a second coil 4B. A steady current is supplied alternately to the coils 4A and 4B from a steady current source 7 through a change-over switch 47.

What is claimed is:

1. An electronic balance comprising:
 a fixed portion including a permanent magnet and a magnetic circuit;
 a movable portion displacing in response to a load applied thereto;
 a coil for inducing a magnetic force defying said load;
 means for supplying a current to said coil at given time intervals alternately in the positive and negative directions;
 a detector for detecting any displacement of said movable portion;
 a feedback controller for controlling said current supply means by the output signals from said detector, whereby the measured value is obtained by subtracting the product of the current $I_2$ in the negative direction and a time fraction $t_2$ for which the same flows from the product of the current $I_1$ in the positive direction and a time fraction $t_1$ for which the same flows, wherein the sum of said time fraction $t_1$ and $t_2$ are equal to each of said time intervals.

2. An electronic balance as defined in claim 1, wherein the current $I_1$ in the positive direction and the current $I_2$ in the negative direction in said time interval are held constant, whereby the measured value is obtained by calculating the difference between said time fractions $t_1$ and $t_2$.

3. An electronic balance as defined in claim 1, wherein the time fractions $t_1$ and $t_2$ are held constant, whereby the measured value is obtained by calculating the difference between said currents $I_1$ and $I_2$.

4. An electronic balance as defined in claim 1, wherein the feedback controller includes a PID controller and a voltage-time difference converter circuit.

5. An electronic balance as defined in claim 4, wherein the voltage-time difference converter includes an integrator and a comparator, said integrator having a given duty-factor and being adapted to receive an input signal which consists of superimposed signals of a clock signal of waveform having equal peak values in the positive and negative, an output signal sent by detector in response to detection of any displacement of said movable portion of the balance, and feedback signals for feeding back part of the current supplied to said coil, and said comparator being adapted to find whether said output signal of said integrator is positive or negative, thereby allowing a negative current to flow into said coil when said output signal is positive and allowing a positive current to flow in when said output signal is negative.

6. An electronic balance as defined in claim 1, wherein the detector is a pair of electrodes whose one end is connected to said movable portion of the balance with the opposite end being constituted by fixed capacitor.

7. An electronic balance as defined in claim 1, wherein the time interval is within the range of 0.1 sec to 0.1 msec.

8. An electronic balance as defined in claim 1, further comprising a frequency divider for dividing a single clock signal produced by a clock oscillator into said time intervals, an up-down counter adapted to work for the upper side when a current flows in the positive direction and work for the lower side when a current flows in the negative direction, and a circuit for leading said clock signal to the input of said up-down counter.

9. An electronic balance as defined in claim 1, wherein the coil comprises a first coil and a second coil, said first coil being adapted to induce a force defying said load and said second coil having inversely turned windings, and wherein said two coils are alternately supplied with a current from a single steacy current source.

* * * * *